(12) United States Patent
Randrianarivony

(10) Patent No.: US 10,648,600 B2
(45) Date of Patent: May 12, 2020

(54) SWIVEL A DECOUPLED CENTRAL RING MEMBER

(71) Applicant: SINGLE BUOY MOORINGS INC., Marly (CH)

(72) Inventor: Liva Christian Randrianarivony, Eze bord de Mer (FR)

(73) Assignee: SINGLE BUOY MOORINGS INC., Marly (CH)

( * ) Notice: Subject to any disclaimer, the term of this patent is extended or adjusted under 35 U.S.C. 154(b) by 313 days.

(21) Appl. No.: 15/105,150

(22) PCT Filed: Dec. 12, 2014

(86) PCT No.: PCT/EP2014/077571
§ 371 (c)(1),
(2) Date: Jun. 16, 2016

(87) PCT Pub. No.: WO2015/091266
PCT Pub. Date: Jun. 25, 2015

(65) Prior Publication Data
US 2016/0312936 A1    Oct. 27, 2016

(30) Foreign Application Priority Data
Dec. 18, 2013 (EP) .................................. 13197962

(51) Int. Cl.
*F16L 27/08* (2006.01)

(52) U.S. Cl.
CPC ......... *F16L 27/082* (2013.01); *F16L 27/0828* (2013.01); *F16L 27/0832* (2013.01); *F16C 2361/00* (2013.01)

(58) Field of Classification Search
CPC . F16L 27/082; F16L 27/0828; F16L 27/0832; F16C 2361/00
(Continued)

(56) References Cited

U.S. PATENT DOCUMENTS 2,599,664 A * 6/1952 Sloan .................... B23B 31/302
                                                    244/76 R
4,635,969 A * 1/1987 Jackson .............. F16L 27/0812
                                                    285/121.3
(Continued)

FOREIGN PATENT DOCUMENTS

EP     2 404 821 A1    1/2012
WO     90/02289 A1    3/1990

OTHER PUBLICATIONS

International Search Report, dated Mar. 2, 2015, from corresponding PCT application.

*Primary Examiner* — Anna M Momper
*Assistant Examiner* — Fannie C Kee
(74) *Attorney, Agent, or Firm* — Young & Thompson

(57) ABSTRACT

A swivel includes an inner and an outer ring. The rings are coaxial and rotatable relative to one another around a central axis, and define a toroidal chamber and an axial seal annulus gap between the rings. The inner and outer rings are rotatably interconnected via a bearing structure. The swivel includes an upper bearing structure and a lower bearing structure on each side of the toroidal chamber. Each bearing structure interconnects the inner and outer rings. An upper and a lower sealing member is situated in the seal annulus gap near a respective upper and lower bearing structure. At least one of the inner and outer rings includes an upper member, a lower member and a central member. The upper and lower members are fixedly attached to the respective upper and lower bearing structures and the central member is independently displaceable relative to the upper and lower ring members.

12 Claims, 3 Drawing Sheets

(58) Field of Classification Search
USPC ........ 285/95, 98, 121.6, 272, 281–282, 351, 285/900
See application file for complete search history.

(56) References Cited

U.S. PATENT DOCUMENTS

| | | | | |
|---|---|---|---|---|
| 4,647,076 | A * | 3/1987 | Pollack | ................... F16L 39/06 277/584 |
| 4,828,292 | A * | 5/1989 | Jansen | ................... F16L 27/087 285/121.6 |
| 4,925,219 | A | 5/1990 | Pollack et al. | |
| 5,312,140 | A * | 5/1994 | Pollack | ................. F16L 27/087 277/364 |
| 2011/0254264 | A1* | 10/2011 | Pollack | ................... F16L 39/06 285/95 |
| 2012/0279979 | A1* | 11/2012 | Huldt | ................... B63B 22/021 220/810 |

* cited by examiner

SWIVEL A DECOUPLED CENTRAL RING MEMBER

FIELD OF THE INVENTION

The invention relates to a swivel comprising an inner and an outer ring, the rings being coaxial and rotatable relative to one another around a central axis, the rings defining a toroidal chamber and an axial seal annulus gap between the rings, the inner and outer rings being rotatably interconnected via a bearing structure.

BACKGROUND OF THE INVENTION

A swivel of the above-mentioned type is described in WO 90/02289. In this publication, a swivel for offshore hydrocarbon production is disclosed wherein dynamic face seals are mounted in complementary stepped annular regions. In the known face seal configuration, the pressurisation effects on the swivel cause the outer ring to decrease in axial length and the inner ring to increase in axial length, hence reducing the axial space of the sealing area. The outer seal ring that contains the face seals deflects outwardly due to pressurisation hence increasing the axial sealing space. By designing the geometry in the known swivel, the effects could cancel out and the axial sealing space remains substantially at the designed dimension.

However, for the above-described face seal swivels the seal annulus gap variation is governed by several complex parameters, some of which are highly non-linear. The extension of the axial dimension of the inner swivel ring and the decrease in axial dimension of the outer swivel ring, or so-called "Poisson's effect" requires advanced Finite Element Analysis (FEA) methods. Furthermore, the radial deformations of each swivel part are not uniform along the vertical axis due to the pressurized area acting only over a limited height, as top and bottom ends of the seal annulus gap are not pressurised for zones beyond the topmost and lowermost dynamic seals. The non-uniform thickness of the swivel rings also affects the radial deformations of each swivel part. The "bowing" of each swivel part requires again advanced FEA analysis methods to arrive at matching vertical deflections of the deformed parts. Finally, varying bolt preloads and varying friction coefficients at the various bolted interfaces affect the stiffness of the different swivel parts. Also, bolt pretension and friction coefficient influence the sliding at the different bolted interfaces which in turn affects the bending (bowing) of the swivel parts.

For a top bearing face seal swivel, all the above effects mostly impact on the bottom dynamic seals that are situated furthest away from the swivel bearing. Face seal swivel fabrication also requires very high machining accuracies. Due to the large number of stacked machined rings, the cumulated fabrication tolerances can be too large, leading to unsuitable seal extrusion gaps, i.e. too large or too narrow. Current swivel designs are at the limit of best manufacturing capabilities base on the current design criteria.

Deformations in the radial and vertical direction of both piston seal and face seal swivels are non-uniform due to presence of swivel openings and external loading (piping loads). Seal grooves and seal running surfaces become oval shaped (piston seal) or are affected by surface irregularities (face seal) These so-called 3D effects lead to local deformations of the seal groove width or seal annulus gap width when the swivel rotates and are believed to be responsible for some seal failure mechanisms.

It is therefore an object of the present invention to provide a swivel that can be manufactured accurately and effectively, using relatively straight forward design tools. It is another object of the invention to provide a swivel in which 3D effects are mitigated and which reduces variations in seal annulus gap width.

SUMMARY OF THE INVENTION

Hereto a swivel according to the invention is characterised by an upper bearing structure and a lower bearing structure each side of the toroidal chamber, each bearing structure interconnecting the inner and outer rings, an upper and a lower sealing member being situated in the seal annulus gap near a respective upper and lower bearing structure, wherein at least one of the inner and outer rings is comprised of an upper member, a lower member and a central member, the upper and lower members being fixedly attached to the respective upper and lower bearing structures and the central member being independently displaceable relative to the upper and lower ring members.

By placing each seal in the vicinity of an upper and a lower bearing, these seals are hardly affected by any thermal, pressure or mechanical loading of the swivel and the non-linear behaviour of the swivel rings is eliminated. Moreover, the cumulated fabrication tolerances are also significantly better for the corresponding seal grooves and seal extrusion gaps due to fewer stacked pieces. By physically decoupling the upper and lower members of either inner ring or outer ring, or of both inner and outer rings, small axial movements of the central ring member relative to the upper and lower ring members are possible. Hereby sufficient flexibility in the axial direction is obtained in view of minimizing internal axial loads resulting from the differential deformations of the different swivel rings, while providing increased stiffness of the sealing area in the vicinity of the upper and lower bearings.

In an embodiment of a swivel according to the invention, the upper and lower ring members are of L-shaped cross-section having axially extending legs, the central ring member contacting the axially extending legs with an axial surface along an interface gap that is situated at a radial distance from the seal annulus gap.

The central ring section defines a static extrusion gap that is situated at a radial distance from the seal annulus gap. The axially oriented surfaces of the L-shaped upper and lower ring members abut against the axial surface of the central ring member while allowing small movements of the central member relative to the upper and lower ring members and decoupling the upper and lower ring members in the axial direction. Preferably, at least one axial sealing element is comprised in the interface gap on each side of the toroidal chamber. These sealing elements can be static sealing elements providing a reliable fluid containment in the toroidal chamber.

In order for the central ring member to rotate together with the upper and lower ring members, the central ring member is rotatable by a drive element about the central axis. The drive member comprises mechanical connections between the upper and lower ring members and the central ring member.

In a further embodiment of a swivel according to the invention, at least one of the upper and the lower sealing members comprises a first face seal along a radial face at the upper part of the seal annulus gap and two coaxial seal containment members attached to the inner and outer ring respectively each comprising stepped section, the stepped section being placed in an overlapping relationship to form a radial seal cavity in which a second face seal is comprised, the bearing structure being attached to the seal containment members.

The face seal areas near the upper and lower bearings can be effectively designed to be subject to a minimum of deformation and in a way that upon pressurisation the Poisson's effect and the bending effect on the stepped sections of the seal containment plates compensate and result in minimal dimensional variations of the seal cavities.

The central ring part comprises a part of the toroidal cavity and may comprise a recessed channel forming half of the toroidal cavity. The cross-sectional shape of this channel may for instance be U-shaped or semicircular, while the static seals may for instance be incorporated in the "legs" of the U-shaped or semi-circular channel.

In order to provide a proper sealing at the static seals of the central ring member, it is preferred that the central ring member has a higher stiffness than the upper and lower ring members. In an embodiment, the radial cross-section of the central ring part is larger than that of the upper and lower ring parts, providing additional rigidity to the central member.

In order to axially position the he central ring member, it comprises an upper and a lower interface plane, the central ring part being along the lower interface plane provided with an axially projecting support part for contacting the lower ring member. The support part maintains a gap between the central ring member and the lower ring member downstream from the static seals. A gap is also present at the upper interface plane between the central and the upper ring members, so that the ring parts are sufficiently decoupled and relative small movements in an axial direction between the upper and lower ring parts are possible.

The bearings of the upper and/or lower ring members may comprises a slide bearing using low friction materials such as brass or low friction thermoplastics. Preferably, at least one of the upper and lower bearings comprises a three-raceway roller bearing.

BRIEF DESCRIPTION OF THE DRAWINGS

Some embodiments of a swivel in accordance with the invention will by way of nonlimiting example, be explained in detailed with reference to the accompanying drawings. In the drawings:

FIG. 1 shows a known swivel 1 with inner ring 2 and outer ring 3. The inner ring 2 is stationary relative to the central axis 4, while the outer ring 3 can rotate around the central axis 4. The inner and outer rings 2, 3 are placed in a coaxial contacting relationship along a seal annulus gap 5 and enclose a toroidal chamber 7. The inner and outer rings 2, 3 are interconnected via an upper slewing bearing structure 8, which in this embodiment is a three-raceway roller bearing. The seal annulus gap 5 is sealed by upper and lower primary face seals 10, 12 and by upper and lower secondary face seals 11, 13. The face seals 10-13 are placed in sealing grooves that are covered by upper sealing rings 14, 15 and lower sealing rings 16, 17. The sealing rings 14-17 are connected to the inner and outer rings 2, 3 via connecting members such as bolts 18,19,18',19'. Replacement or inspection of the seals 10-13 can be carried out by releasing the bolts 18-19' and removing the rings 14-17. The number of dynamic seals 10-13 on either sides of the toroidal chamber must at least be one but can also be more than two where the standard is three, and up to four seals on very high pressure systems featuring a cascade system invented by the applicant.

Figure 1:
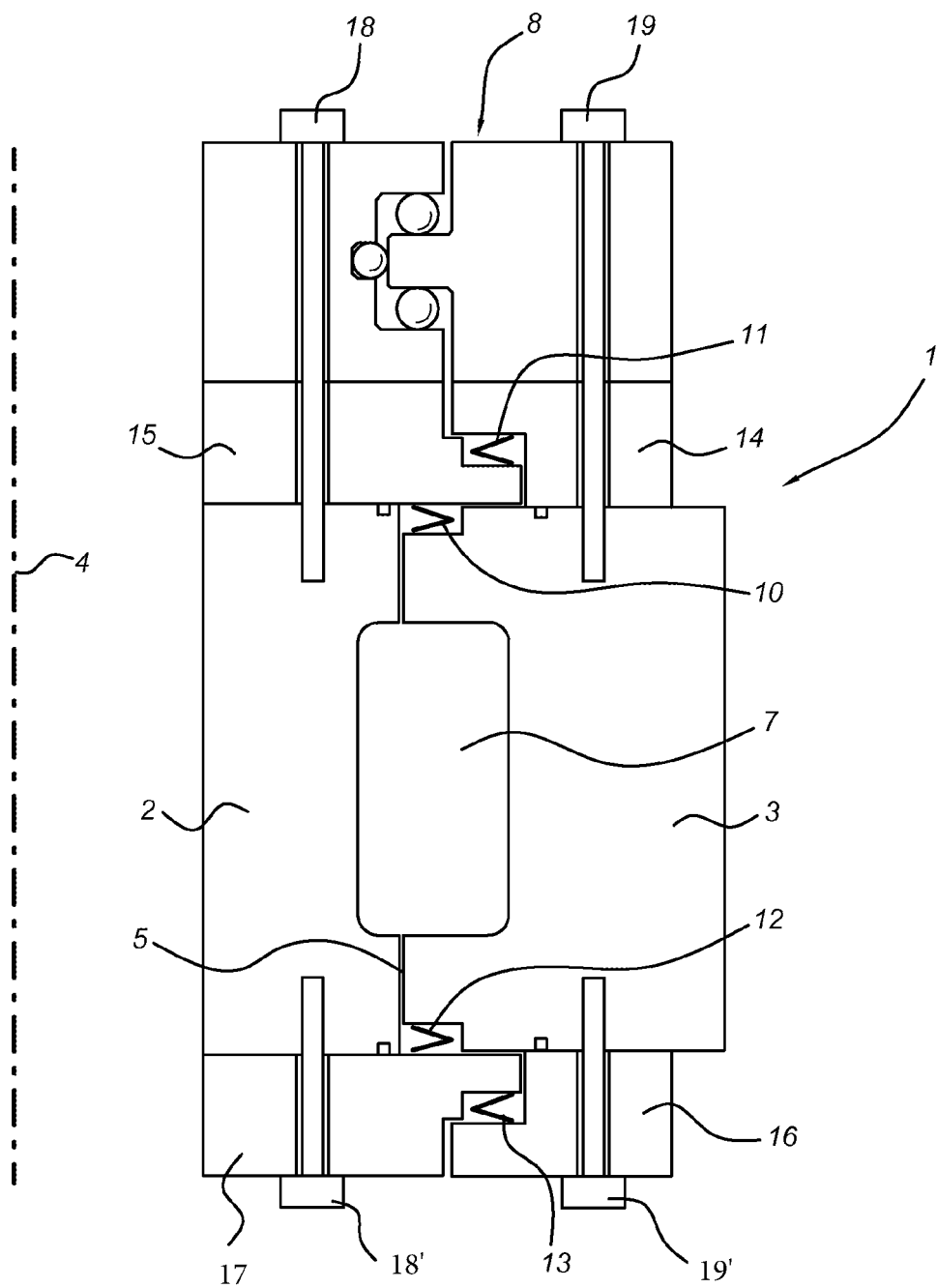
FIG. 1 schematically shows a swivel known in the prior art.

In the known swivel 1, the inner ring 2 is connected to a stationary hydrocarbon transfer pipe, while the outer swivel ring 3 is connected to a rotating hydrocarbon transfer pipe, which pipes are not shown in the figure. The swivel 1 can be used in a swivel stack on a floating offshore structure, such as for instance a floating production storage and offloading structure (FPSO), for offshore hydrocarbon exploration and/or processing. Such a swivel stack is placed on a turret that is connected to subsea hydrocarbon risers, the offshore structure being able to weathervane around the turret in order to align itself with the prevailing wind and current directions. The risers will be attached to the inner swivel rings 2 of the swivel stack, whereas piping on the vessel is connected to outer rings 3 of swivels in the stack. Temperatures and pressures inside the toroidal chamber 7 can range from −120° to 150° C. temperature and full vacuum up to 12000 psi (830 bars) for non-cryogenic applications. Cryogenic applications are also possible by the use of adequate low temperature material for the swivel parts (such as 316 stainless steel grade).

Figure 2:
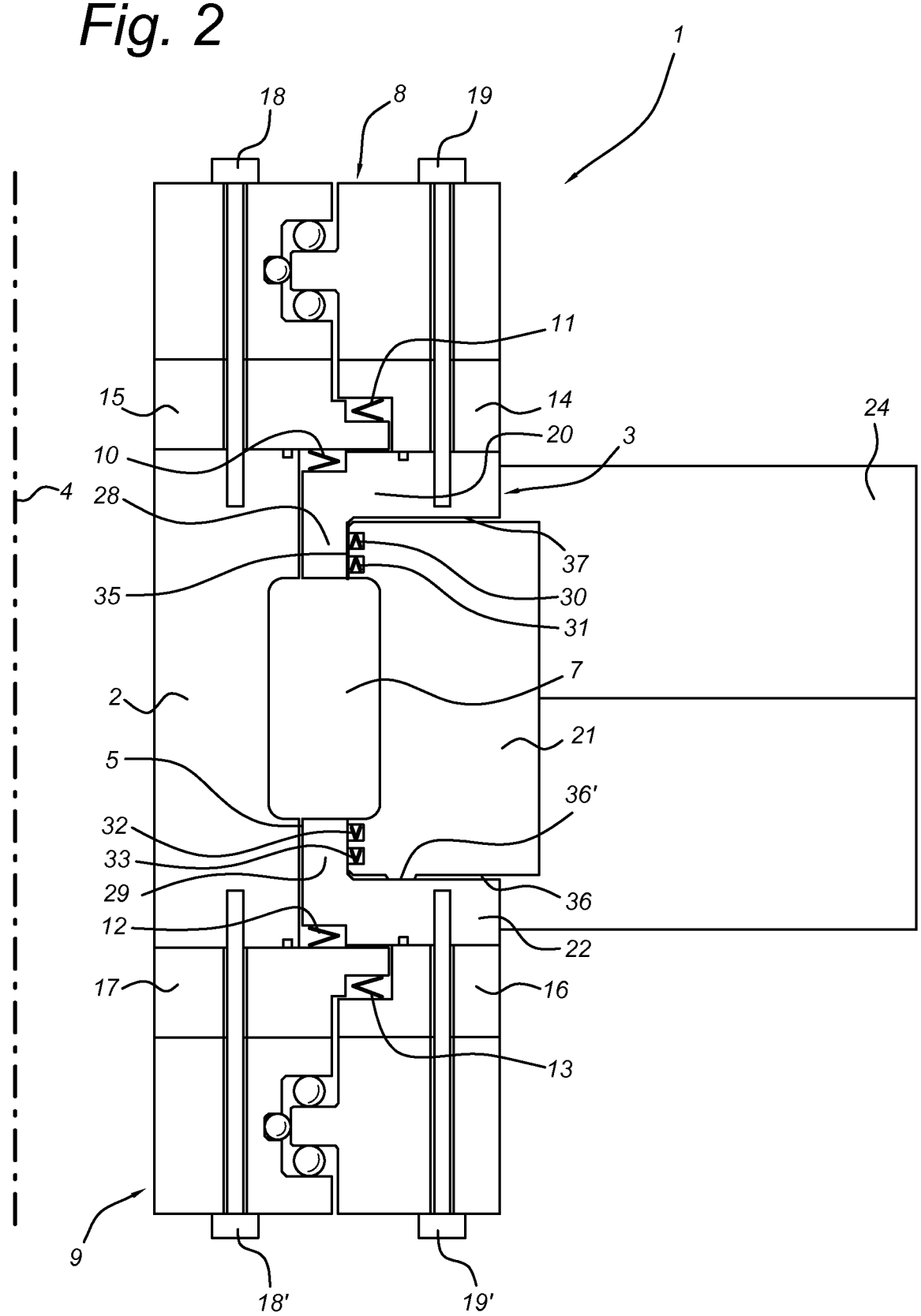
FIG. 2 shows a swivel according to the invention comprising upper and lower three-raceway bearings.

FIG. 2 shows a swivel 1 according to the invention, comprising an upper bearing structure 8 and a lower bearing structure 9. The outer ring 3 is made of an upper ring member 20, central ring member 21 and lower ring member 22. The ring members 20-22 are formed of separate parts, and are mechanically interconnected via a schematically indicated link or drive element 24. The main purpose of the drive element is to connect simultaneously in rotation the ring members 20-22 while permitting free relative axial movements. The central ring member 21 can move over small distances, typically up to a couple of millimeters, relative to the upper and lower ring members 20, 22 in the axial direction. Hereby the upper and lower bearing structures 8,9 are sufficiently uncoupled to rotate freely without being unnecessarily loaded by the internal loads developed by the differential deformations of the different swivel parts under pressure.

In FIG. 2 it can be seen that the upper and lower ring members 20, 22 each have an L-shaped cross-section with axially extending legs 28,29. The central ring member 21 is generally U-shaped and forms a part of the toroidal chamber 7. The upstanding sides of the U-shaped ring member 21 each comprise two static seals 30, 31, 32, 33 that seal the axial interface gap 35 between the ring members 20, 22 and the central ring member 21. At the lower interface plane 36 of the central ring member 21, a support part 36' is provided, contacting the lower ring member 22 for positioning the central member 21 such that at the upper interface plane 37 and the lower interface plane 36, a few millimeters gap in width remains. The small movements of the central ring member 21 along the vertical axis include sliding at the piston seals interface—reference numerals 30 and 31. Sliding at the lower interface near reference numerals 32 and 33 would be significantly less due to their close proximity to the support part 36' permitting, for instance, the ring 20 to slide (almost freely) up and down with respect to ring 21. The corresponding axial displacements can be as large a couple of millimeters.

Figure 3:
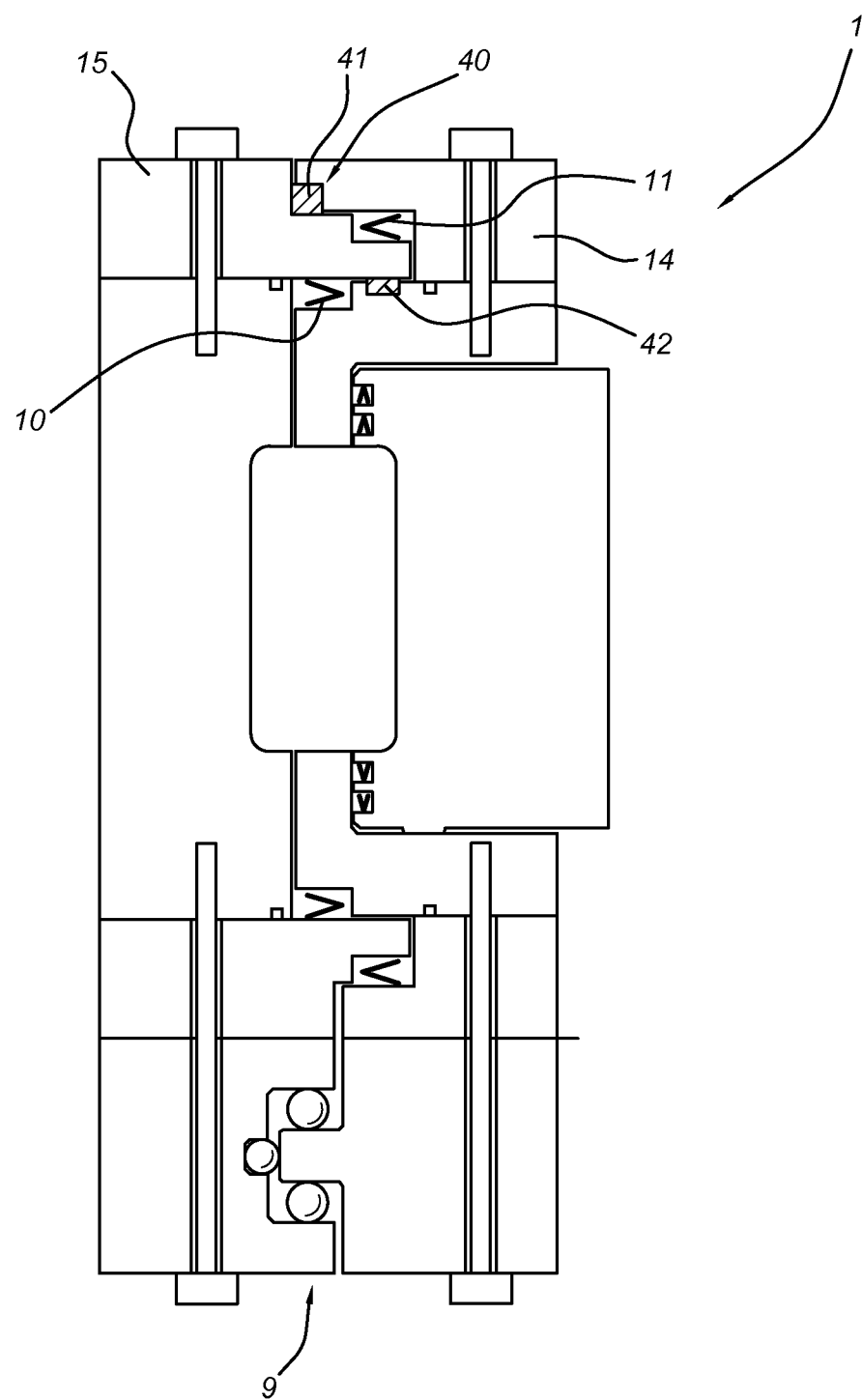
FIG. 3 shows an embodiment of a swivel according to the invention comprising an upper slide bearing and a lower three-raceway bearing.

FIG. 3 shows an embodiment in which the top bearing structure 40 is formed by thrust low friction bushes 41, 42, that are comprised in recesses enclosed by stepped surfaces of the upper sealing rings 14, 15. The lower bearing 9 is formed by a three-raceway bearing. It is also possible to replace bearing 9 by a slide bearing of a type similar to the top bearing structure 40.

In the embodiments shown, the outer, rotating ring 3 is formed of three individual members 20,21,22, but alternatively, it is also possible to form the inner ring 2 of three individual members.

The invention claimed is:

1. A swivel comprising:
an inner ring and an outer ring,
the inner and outer rings being coaxial and rotatable relative to one another around a central axis,
the inner and outer rings defining a toroidal chamber having an inner chamber surface and an axial seal annulus gap between the inner and outer rings,
a bearing structure comprised of an upper bearing structure and a lower bearing structure on each side of the toroidal chamber,
the inner and outer rings being rotatably interconnected via the bearing structure,
each of the upper bearing structure and the lower bearing structure interconnecting the inner and outer rings,
the axial seal annulus gap extending from the toroidal chamber to the bearing structure,
an upper sealing member and a lower sealing member being situated in the seal annulus gap near a respective upper and lower bearing structure,
wherein at least one of the inner and outer rings is comprised of an upper ring member, and a lower ring member of L-shaped cross section with each upper and lower ring member having a radially extending leg and an axially extending leg that defines a part of the inner chamber surface, and a central ring member defining a further part of the inner chamber surface and contacting the axially extending legs with an axial surface along an interface gap which interface gap extends from the toroidal chamber along the axially extending legs and is situated at a radial distance from the annulus gap, the central ring member having and with a radial interface planes that extend from the interface gap along the radially extending legs of the upper and lower ring members,
the upper and lower ring members being fixedly attached to the respective upper and lower bearing structures and the central ring member being independently displaceable relative to the upper and lower ring members in an axial direction along the interface gap.

2. The swivel according to claim 1, wherein at least one axial sealing element is comprised in the interface gap on each side of the toroidal chamber.

3. The swivel according to claim 1, wherein the central ring member is rotatable by a drive element about the central axis.

4. The swivel according to claim 3, wherein the drive element comprises a mechanical connection between at least one of the upper and lower ring members and the central ring member.

5. The swivel according to claim 1, wherein at least one of the upper and the lower sealing members comprises a first face seal along a radial face at an upper part of the seal annulus gap and two coaxial seal containment members attached to the inner and outer ring each respectively comprising a stepped section, the stepped sections being placed in an overlapping relationship to form a radial seal cavity in which a second face seal is comprised, the bearing structures being attached to the seal containment members.

6. The swivel according to claim 1, wherein the central ring member comprises a part of the toroidal chamber.

7. The swivel according to claim 1, wherein a radial stiffness of the central ring member larger than that of the upper and lower ring members.

8. The swivel according to claim 1, wherein the central ring member comprises an upper and a lower interface plane, the central ring member along the lower interface plane being provided with an axially projecting support part for contacting the lower ring member.

9. The swivel according to claim 1, wherein at least one of the bearing structures comprises a slide bearing.

10. The swivel according to claim 1, wherein at least one of the bearing structures comprises a three-raceway roller bearing.

11. The swivel according to claim 1, at least one axial sealing element being comprised in the interface gap on each side of the toroidal chamber.

12. The swivel according to claim 11, further comprising a drive element, wherein the central ring member is rotatable by the drive element about the central axis, and wherein the drive element comprises a mechanical connection between at least one of the upper and lower ring members and the central ring member.

* * * * *